(12) United States Patent  
Lee (10) Patent No.: US 9,310,569 B2
(45) Date of Patent: Apr. 12, 2016

(54) RECONFIGURABLE FIBER OPTIC ADAPTER (71) Applicant: ALLIANCE FIBER OPTIC PRODUCTS, INC., New Taipei (TW)

(72) Inventor: Wei-Cheng Lee, New Taipei (TW)

(73) Assignee: Alliance Fiber Optic Products, Inc., New Taipei (TW)

( * ) Notice: Subject to any disclaimer, the term of this patent is extended or adjusted under 35 U.S.C. 154(b) by 0 days.

(21) Appl. No.: 14/569,886

(22) Filed: Dec. 15, 2014

(65) Prior Publication Data

US 2015/0241644 A1 Aug. 27, 2015

Related U.S. Application Data (60) Provisional application No. 61/966,301, filed on Feb. 21, 2014.

(51) Int. Cl.
*G02B 6/38* (2006.01)

(52) U.S. Cl.
CPC ............ *G02B 6/3831* (2013.01); *G02B 6/3825* (2013.01); *G02B 6/3885* (2013.01)

(58) Field of Classification Search
CPC .. G02B 6/3897; G02B 6/3831; G02B 6/3825; G02B 6/3885
See application file for complete search history.

(56) References Cited

U.S. PATENT DOCUMENTS

| | | | | |
|---|---|---|---|---|
| 4,186,997 A | * | 2/1980 | Schumacher | 385/65 |
| 4,376,565 A | * | 3/1983 | Bird et al. | 439/681 |
| 4,448,467 A | * | 5/1984 | Weidler | 439/80 |
| 4,580,868 A | * | 4/1986 | Verstijnen | 439/680 |
| 4,645,295 A | * | 2/1987 | Pronovost | 385/55 |
| 4,711,511 A | * | 12/1987 | Noorily | 439/347 |
| 4,904,199 A | * | 2/1990 | Ducassou | 439/304 |
| 4,979,792 A | * | 12/1990 | Weber et al. | 385/53 |
| 4,986,769 A | * | 1/1991 | Adams et al. | 439/681 |
| 5,166,995 A | * | 11/1992 | Briggs et al. | 385/58 |
| 5,183,408 A | * | 2/1993 | Hatagishi | 439/147 |
| 5,265,181 A | * | 11/1993 | Chang | 385/75 |
| 5,289,554 A | * | 2/1994 | Cubukciyan et al. | 385/76 |
| 6,149,313 A | * | 11/2000 | Giebel et al. | 385/59 |
| 6,257,917 B1 | * | 7/2001 | Hyzin | 439/358 |
| 6,538,882 B2 | * | 3/2003 | Branch et al. | 361/679.02 |
| 6,634,796 B2 | * | 10/2003 | de Jong et al. | 385/56 |
| 6,910,911 B2 | * | 6/2005 | Mellott et al. | 439/358 |
| 6,994,478 B1 | * | 2/2006 | Chiu et al. | 385/88 |
| 7,182,523 B2 | * | 2/2007 | Abendschein et al. | 385/56 |
| 7,325,975 B2 | * | 2/2008 | Yamada et al. | 385/54 |
| 7,374,347 B1 | * | 5/2008 | Oki et al. | 385/89 |
| 7,476,118 B2 | * | 1/2009 | Amidon | 439/353 |
| 7,674,046 B2 | * | 3/2010 | Milette | 385/53 |
| 8,167,638 B2 | * | 5/2012 | Wojcik et al. | 439/352 |
| 8,262,403 B2 | * | 9/2012 | Slippy et al. | 439/353 |
| 8,724,955 B2 | * | 5/2014 | LaVoie et al. | 385/134 |

(Continued)

*Primary Examiner* — Peter Radkowski
(74) *Attorney, Agent, or Firm* — Rosenberg, Klein & Lee (57) ABSTRACT

A reconfigurable fiber optic adapter for connecting male and female optical fiber connectors is disclosed to include a housing having two recessed located in opposing top and bottom sides of one end thereof and opposing first and second keyways located in opposing top and bottom sides of a optical fiber connector passage therein, and a first mating-connection control member with an On key and a second mating-connection control member with an OFF key selectively exchangeably mounted in the two recesses of the housing for controlling the insertion direction of a male optical fiber connector.

7 Claims, 12 Drawing Sheets

(56) References Cited

U.S. PATENT DOCUMENTS

| | | |
|---|---|---|
| 2001/0026661 A1* | 10/2001 | de Jong et al. .................. 385/56 |
| 2002/0167793 A1* | 11/2002 | Branch et al. .................. 361/686 |
| 2004/0228582 A1* | 11/2004 | Yamada et al. ................. 385/81 |
| 2005/0095899 A1* | 5/2005 | Mellott et al. ................ 439/358 |
| 2006/0140543 A1* | 6/2006 | Abendschein et al. ......... 385/55 |
| 2008/0032536 A1* | 2/2008 | Lappoehn ..................... 439/310 |
| 2008/0248691 A1* | 10/2008 | Amidon ........................ 439/607 |
| 2008/0311781 A1* | 12/2008 | Wojcik et al. ................. 439/352 |
| 2011/0059642 A1* | 3/2011 | Slippy et al. .................. 439/353 |
| 2012/0190230 A1* | 7/2012 | Wojcik et al. ................. 439/352 |
| 2012/0257865 A1* | 10/2012 | LaVoie et al. ................. 385/134 |

* cited by examiner

RECONFIGURABLE FIBER OPTIC ADAPTER

This reference is based on Provisional Application Ser. No. 61/966,301, filed on Feb. 21, 2014.

BACKGROUND OF THE INVENTION

1. Field of the Invention

The present invention relates to electrical connector technology and more particularly, to a reconfigurable fiber optic adapter, which allows position exchange between two mating-connection control members that are provided with an Off key or On key, controlling the insertion direction of a mating optical fiber connector.

2. Description of the Related Art

With rapid development of modern communications technology and the Internet, data centers and telecommunications providers are trying hard to provide relative equipment having the characteristics of high density, high transmission speed, high capacity and high intelligence. In order to meet the demands for faster data transmission speed, smaller footprint and lower energy consumption, the physical infrastructure of cabling system has been receiving more attention than ever before. Cable and optical fiber transmission systems are two important transmission media in a data center cabling system. When compared with a cable transmission system, an optical fiber transmission system has the advantages of wider bandwidth, faster transmission speed, longer transmission distance, thinner dimension, stronger anti-electromagnetic interference and better confidentiality. Optical fiber transmission system is bound to become the hottest trend in the future.

Further, a fiber optic adapter is a component widely used in optical fiber transmission systems for the connection of two optical fiber connectors at two fiber optic cables to mechanically couple and align the cores of fibers so that an optical signal can be maximally coupled from the fiber optic cable at the transmitter side to the fiber optic cable at the receiver side. A variety of optical fiber connectors are commercially available, but SC. LC and ST connectors are the most common types of connectors on the market. In many data center applications, small (e.g., LC) and multi-fiber (e.g., MPO/MTP) connectors are replacing larger, older styles (e.g., SC), allowing more fiber ports per unit of rack space. High density MTP/MPO trunk cables with at least 12 fibers or up to 288 fibers in a single cable. When mounting the optical fiber connectors of two fiber optic cables in a fiber optic adapter for connection, the polarity and connection compatibility between the two fiber optic cables must be accurately controlled to prevent optical signal transmission failure.

Figure 11:
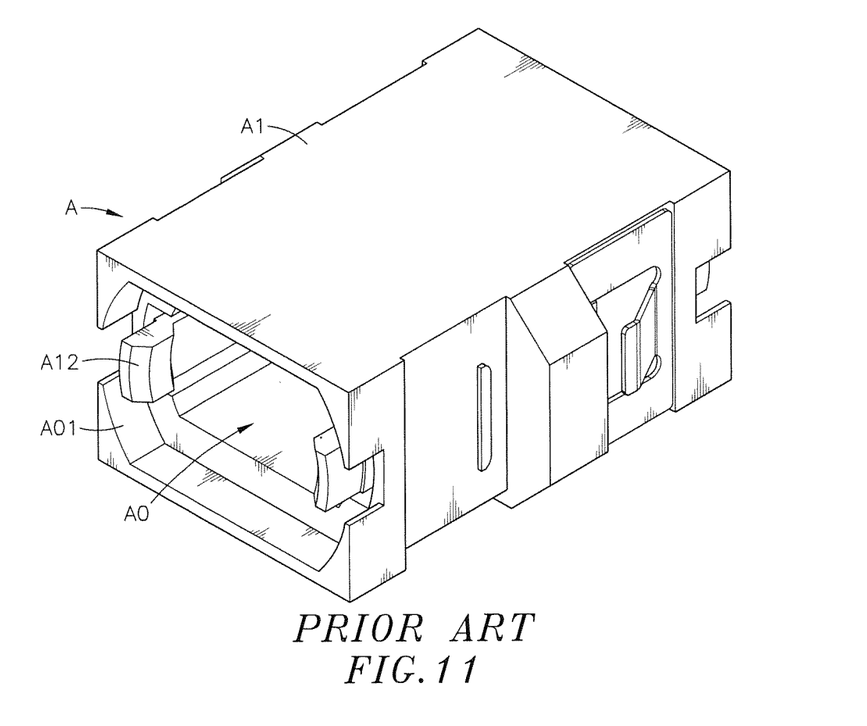
FIG. 11 is an oblique top elevational view of a fiber optic adapter according to the prior art.
Figure 12:
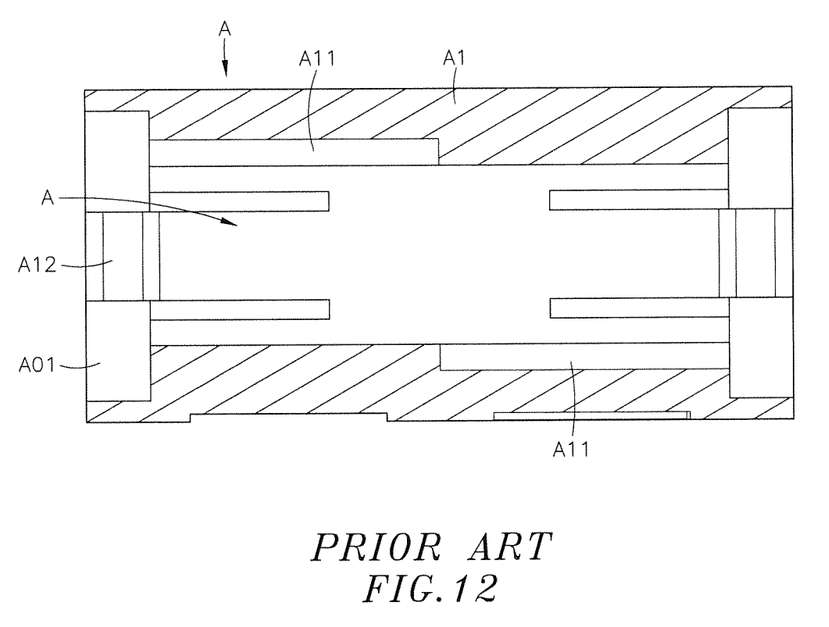
FIG. 12 is a sectional side view of the fiber optic adapter according to the prior art.

FIGS. 11 and 12 illustrate a fiber optic adapter according to the prior art. According to this design, the fiber optic adapter comprises a housing A. The housing A comprises a body A1, two plug mouths A01 located in opposing front and rear sides of the body A1, a passage A0 extending through the body A1 in communication between the two plug mouths A01, two keyways A11 respectively located in opposing top and bottom sides in the passage A0 and respectively longitudinally extended from the two plug mouths A01 to a middle part of the passage A0, and two pairs of springy hooks A12 respectively suspending in the plug mouths A01 at two opposite lateral sides. In application, the plug members of the male and female optical fiber connectors are respectively inserted through the plug mouths A01 into the passage A0 to force the respective directional keys thereof into the respective keyways A11 and the respective hook holes thereof into engagement with the respective springy hooks A12, enabling the guide pins at the plug member of the male optical fiber connector to be respectively engaged into the alignment holes in the plug member of the female optical fiber connector for transmitting an optical signal.

Further, the fiber optic cable connected to an optical fiber connector may be used for transmitting or receiving an optical signal. When two mating optical fiber connectors are mounted in the passage A0 in the housing A, the signal-transmitting fiber optic cable at one optical fiber connector in connected in line with the signal-receiving fiber optic cable at the other optical fiber connector. If the signal-transmitting fiber optic cable and the signal-receiving fiber optic cable are installed in the optical fiber connectors in the wrong direction, the polarity is reversed, and the optical fiber connectors that are mounted in the passage A0 in the housing A will be unable to work normally. At this time, the user needs to disconnect the fiber optic cable from the respective optical fiber connector and then correctly installed the fiber optic cable in the optical fiber connector again. During this mounting procedure, it is difficult and complicated to affix the optical fibers to the plug member of the optical fiber connector with epoxy resin and to polish the ends of the optical fibers. Further, this mounting procedure wastes much time and labor.

Therefore, it is desirable to provide a reconfigurable fiber optic adapter that can be reconfigured conveniently to fit the polarity of the fiber optic cable of the mating optical fiber connector.

SUMMARY OF THE INVENTION

The present invention has been accomplished under the circumstances in view. It is therefore the main object of the present invention to provide a reconfigurable fiber optic adapter, which allows position exchange between two mating-connection control members to control the insertion direction of a mating optical fiber connector.

To achieve this and other objects of the present invention, a reconfigurable fiber optic adapter of the invention is adapted for connecting male and female optical fiber connectors together, comprising a housing and two mating-connection control members. The housing comprises a base portion, two mating connection portions located at opposing front and rear sides of the base portion, a passage extending through the two mating connection portions and the base portion, two plug mouths respectively formed in the mating connection portions in communication between the passage and the atmosphere, a first keyway located in an inner top wall inside the passage and extending from one plug mouth to the other, a second keyway located in an opposing inner bottom wall inside the passage and extending from one plug mouth to a middle part in the base portion, two recesses located in opposing top and bottom sides of one mating connection portion, two mounting groove units bilaterally located in each recess, and two pairs of hook holes located in the opposing top and bottom sides of the mating connection portion carrying the recesses. The two mating-connection control members are selectively and exchangeably mounted in the mounting groove units in the recesses for controlling the insertion direction of a mating optical fiber connector. Each mating-connection control member comprises a base panel inserted into one recess of the housing, two hook rods extended from the base panel and hooked in respective hook holes in the housing, and an Off key or On key located on a middle part of a bottom side of the base panel. The Off key of one mating-connection control member and the On key of the other mating-connection control member have different heights so that the Off key projects into the sliding path of one of the first keyway and second keyway, and the On key is kept in flush with the bottom wall of the other of the first keyway and second keyway. Thus, the invention allows the optical fiber connector at the end-user side to be conveniently connected to the optical fiber connector at the telecommunication-operator side without reconfiguring the connection between the fiber optic cable and the respective optical fiber connector, saving much installation time and labor and assuring a high level of structural stability.

Further, each hook rod of each mating-connection control member is terminated in a beveled guide face and then a stepped engagement portion. When inserting the base panel of each mating-connection control member into one respective recess of the housing, the beveled guide faces of the hook rods will be forced against a part of the respective mating connection portion to elastically deform the hook rods. At this time, the Off key is inserted into the sliding path of the first keyway or second keyway, the On key will be kept away from the sliding path of the first keyway or second keyway. After the base panel is pushed into position, the stepped engagement portions of the hook rods are respectively hooked in the respective hook holes in the housing to lock the respective mating-connection control members to the housing. After the two mating-connection control members are installed in the housing, the On key and the Off key face toward each other. Further, the two mating-connection control members are colored in different colors for easy identification of the Off key or On key.

Further, when the plug member of one optical fiber connector is inserted through one plug mouth of the housing into the passage, the On key is kept away from the sliding path of the first keyway or second keyway so that the directional key of the inserted optical fiber connector can pass over the On key into the deep inside of the passage and connected to the other mating optical fiber connector in the opposite side of the housing of the reconfigurable fiber optic adapter for transmitting an optical signal. By means of suspending the Off key in the sliding path in the first keyway, the directional key of the optical fiber connector will be stopped by the Off key from entering the passage, preventing installation of the optical fiber connector in the wrong direction.

DETAILED DESCRIPTION OF THE PREFERRED EMBODIMENT

Referring to FIGS. 1-6, a reconfigurable fiber optic adapter in accordance with the present invention is shown. The reconfigurable fiber optic adapter comprises a housing 1, and two mating-connection control members 2.

The housing 1 comprises a base portion 11, two side flanges 111 symmetrically located at opposing left and right sides of the base portion 11, two mating connection portions 12 located at opposing front and rear sides of the base portion 11, a passage 10 extending through the two mating connection portions 12 and the base portion 11, two plug mouths 101 respectively formed in the mating connection portions 12 in communication between the passage 10 and the atmosphere, a first keyway 121 located in an inner top wall inside the passage 10 and extending from one plug mouth 101 (the plug mouth at the front side) to the other (the plug mouth at the rear side), a second keyway 122 located in an opposing inner bottom wall inside the passage 10 and extending from one plug mouth 101 (the plug mouth at the front side) to a middle part in the base portion 11, two recesses 13 located in opposing top and bottom sides of one mating connection portion 12 (the front-sided mating connection portion), two mounting groove units 131 bilaterally located in each recess 13, each mounting groove unit 131 comprising a sliding groove 1311 located at one lateral side and an abutment block 1312 located at an opposite lateral side, a plurality of hook holes 132 located in the opposing top and bottom sides of the same mating connection portion 12 (the front-sided mating connection portion), two pairs of slots 123 located in opposing left and right sides of the mating connection portions 12 in communication with the respective plug mouths 101, two pairs of springy hooks 14 respectively disposed adjacent to the slots 123 and respectively terminating in an inwardly protruded hooked portion 141, a locating groove 124 extending around the periphery of the other mating connection portion 12 (the rear-sided mating connection portion), and a substantially ⊓-shaped positioning member 15 mounted in the locating groove 124. The positioning member 15 comprises two clasp shrapnels 152 respectively obliquely extended from two opposite side panels 151 thereof in direction toward the side flanges 111.

The two mating-connection control members 2 are respectively mounted in the recesses 13 of the housing 1. Each mating-connection control member 2 comprises a base panel 21, two hook rods 211 bilaterally backwardly extended from a rear side of the base panel 21 and respectively terminating in a beveled guide face 2111 and then a stepped engagement portion 2112, two guide blocks 212 bilaterally located at a bottom side of the base panel 21 adjacent to the hook rods 211 and respectively defining with the base panel 21 a stepped surface portion 2122, two stop blocks 2121 respectively formed integral with the guide blocks 212 and respectively extending out of two opposite lateral sides of the base panel 21 at right angles relative to the hook rods 211, and an Off key 22 or On key 23 located at the bottom side of the base panel 21 between the two guide blocks 212, and a position-limit sliding groove 2123 located in the bottom side of the base panel 21 between the Off key 22 or On key 23 and each guide block 212. Further, the height of the Off key 22 is larger than the height of the guide blocks 212. Further, the height of the On key 23 is larger than the height of the guide blocks 212.

In installation, insert the base panels 21 of the mating-connection control members 2 into the recesses 13 in one mating connection portion 12 of the housing 1 to force the hook rods 211 through the respective mounting groove units 131 to the respective hook holes 132. At this time, the beveled guide faces 2111 of the hook rods 211 are moved over respective rear walls of the respective mounting groove units 131 and curved elastically, the guide blocks 212 are respectively moved into the respective sliding grooves 1311 in the respective recesses 13 with the respective stop blocks 2121 stopped at respective rear ends of the respective sliding grooves 1311 and the respective position-limit sliding grooves 2123 respectively forced into engagement with the respective abutment blocks 1312 in the respective mounting groove units 131, and the Off key 22 of one mating-connection control member 2 and the On key 23 of the other mating-connection control member 2 are respectively aimed at the first keyway 121 and second keyway 122. After the base panels 21 of the mating-connection control members 2 are fully inserted into the recesses 12 of the housing 1, the hook rods 211 immediately return to their former shape to force the respective stepped surface portions 2122 into engagement with the respective hook holes 132, and thus, the mating-connection control members 2 are locked to the mating connection portion 12 of the housing 1. After installation, the Off key 22 of one mating-connection control member 2 partially protrudes in the first keyway 121; the On key 23 of the other mating-connection control member 2 faces toward the Off key 22 and kept in flush with a bottom wall of the second keyway 122.

Referring to FIGS. 7-10, the reconfigurable fiber optic adapter of the invention is adapted to connect male and female optical fiber connectors 3. The male and female optical fiber connectors 3 each comprise a housing 31, a spring member 323 mounted in the housing 31, a plug member 32 supported on the spring member 323 and partially forced out of a front side of the housing 31 by the spring member 323 and having two guide pins 321 or alignment holes 322 located in a front side thereof, a directional key 311 located at a bottom wall of the housing 31, two hook holes 312 located in two opposite lateral sidewalls of the housing 31 near a rear side thereof, a fiber optic cable 33 connected to an opposing rear side of the housing 31 and having a plurality of optical fibers 331 connected to the plug member 32, and a sliding sleeve 34 slidably mounted around the housing 31.

Further, the reconfigurable fiber optic adapter of the invention can be used in a data center, optical-fiber communication system, data storage equipment of a network system, computer peripheral apparatus, or other high-speed high-capacity information equipment. In application, one mating connection portion 12 of the housing 1 of the reconfigurable fiber optic adapter is connected to the end-user side, the other mating connection portion 12 of the housing 1 is connected to the telecommunication-operator side, and the side flanges 111 at the base portion 11 are fastened with the clasp shrapnels 152 of the positioning member 15 to an optical fiber splice box, digital distribution panel, fiber optic terminal box or the housing of other fiber optic equipment (not shown). After installation of the reconfigurable fiber optic adapter, the male and female optical fiber connectors 3 can then be connected to the reconfigurable fiber optic adapter. At this time, insert the plug member 32 of the optical fiber connector 3 through the plug mouth 101 in the front (or rear) side of the housing 1 into the passage 10 to force the directional key 311 into the first keyway 121.

In installation, turn the male optical fiber connector 3 through 180° to have the directional key 311 face down, and then push the sliding sleeve 34 forwards to move the plug member 32 through the plug mouth 101 of the housing 1 of the reconfigurable fiber optic adapter into the passage 10. Because the On key 23 is kept in flush with the bottom wall of the second keyway 122, the directional key 311 can be moved over the On key 23 into the second keyway 122. As soon as the male optical fiber connector 3 is inserted into position in the reconfigurable fiber optic adapter, the hooked portions 141 of the respective springy hooks 14 are respectively hooked in the hook holes 312 of the housing 31, and therefore the male optical fiber connector 3 is locked to the housing 1 of the reconfigurable fiber optic adapter. After insertion of the male and female optical fiber connectors 3 into the reconfigurable fiber optic adapter, the guide pins 321 of the plug member 32 of the male optical fiber connector 3 are respectively plugged into the respective alignment holes 322 of the plug member 32 of the female optical fiber connector 3 for the transmission of an optical signal. Thus, when inserting the male optical fiber connector 3 into the passage 10 in the housing 1 with the directional key 311 facing upwards, the directional key 311 will be stopped by the Off key 22 from entering the first keyway 121, preventing erroneous connection between the male and female optical fiber connectors 3.

Figure 1:
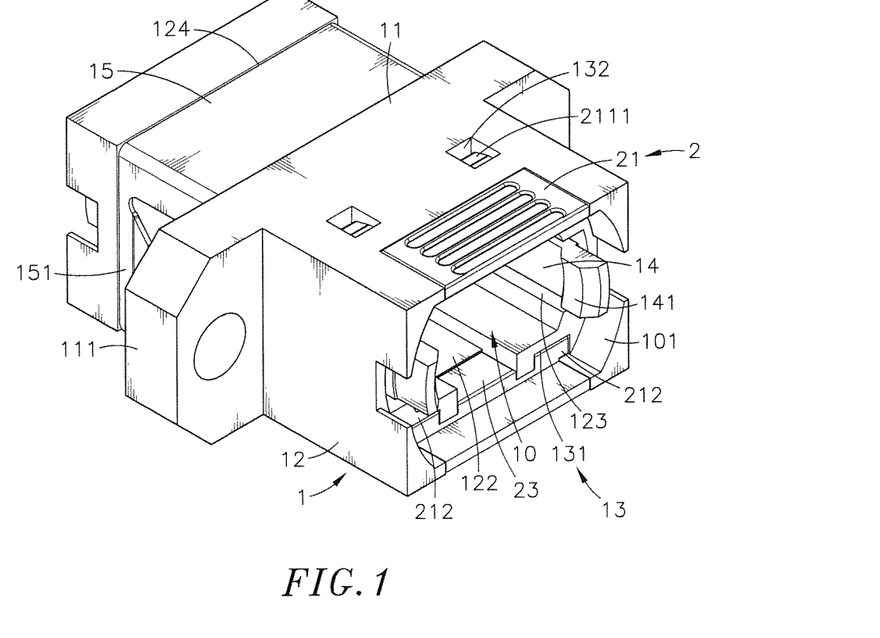
FIG. 1 is an oblique elevational view of a reconfigurable fiber optic adapter in accordance with the present invention.
Figure 2:
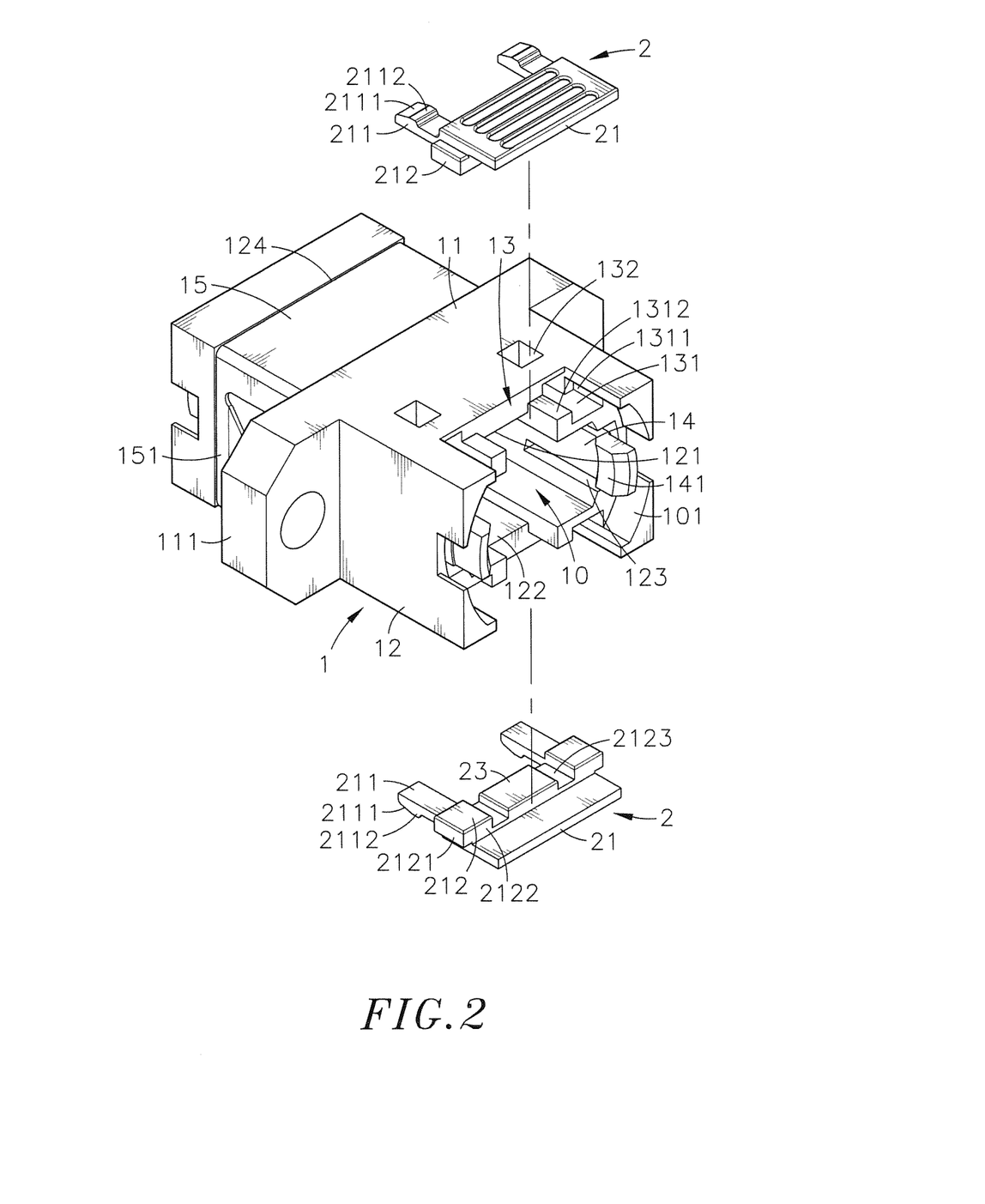
FIG. 2 is an exploded view of the fiber optic adapter in accordance with the present invention.
Figure 3:
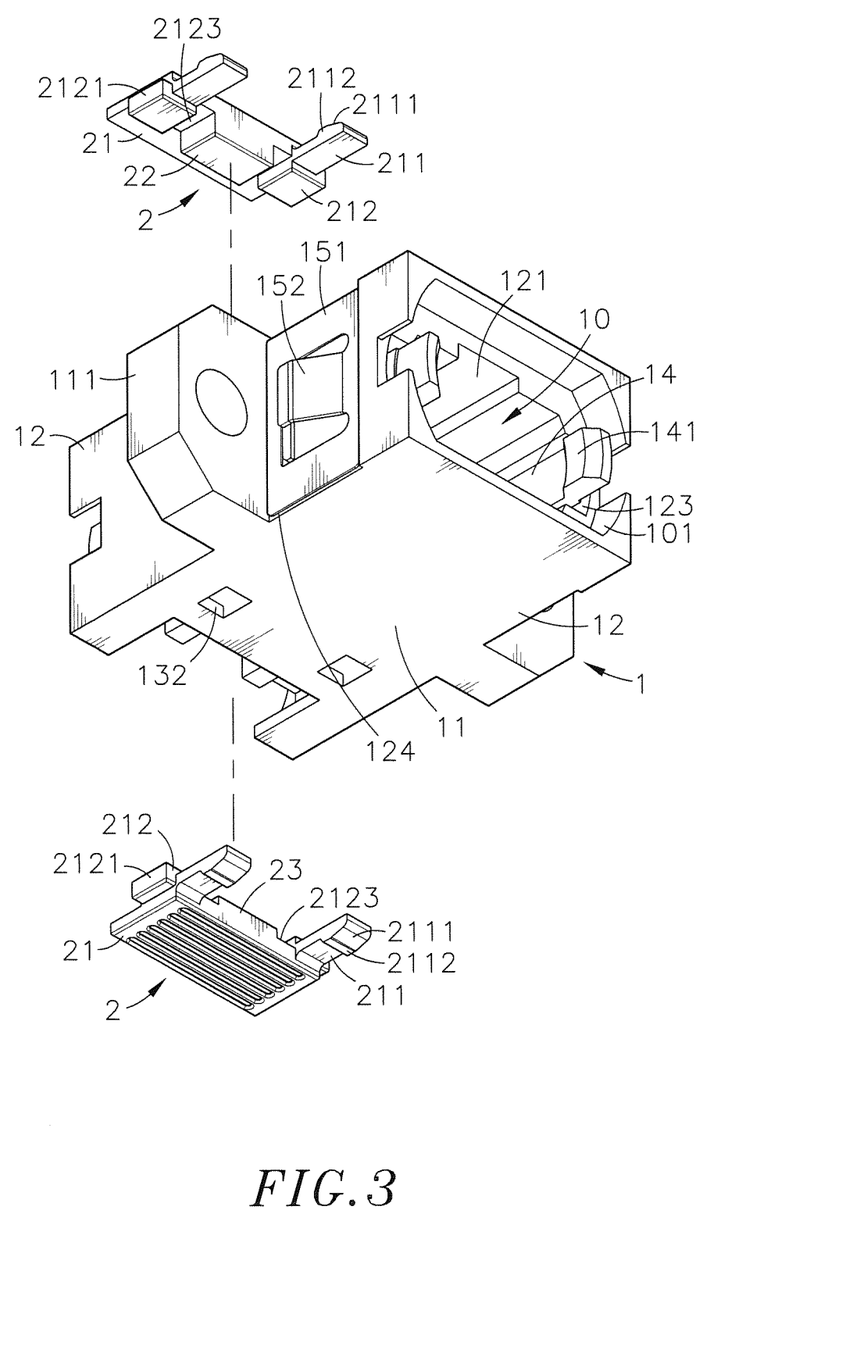
FIG. 3 corresponds to FIG. 2 when viewed from another angle.
Figure 4:
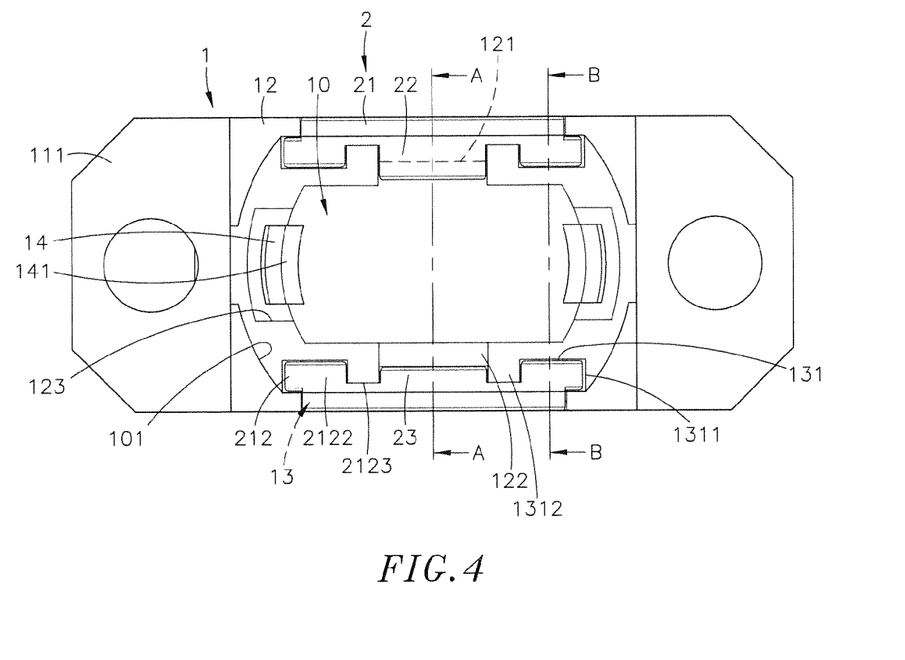
FIG. 4 is a sectional front view of the fiber optic adapter in accordance with the present invention.
Figure 5:
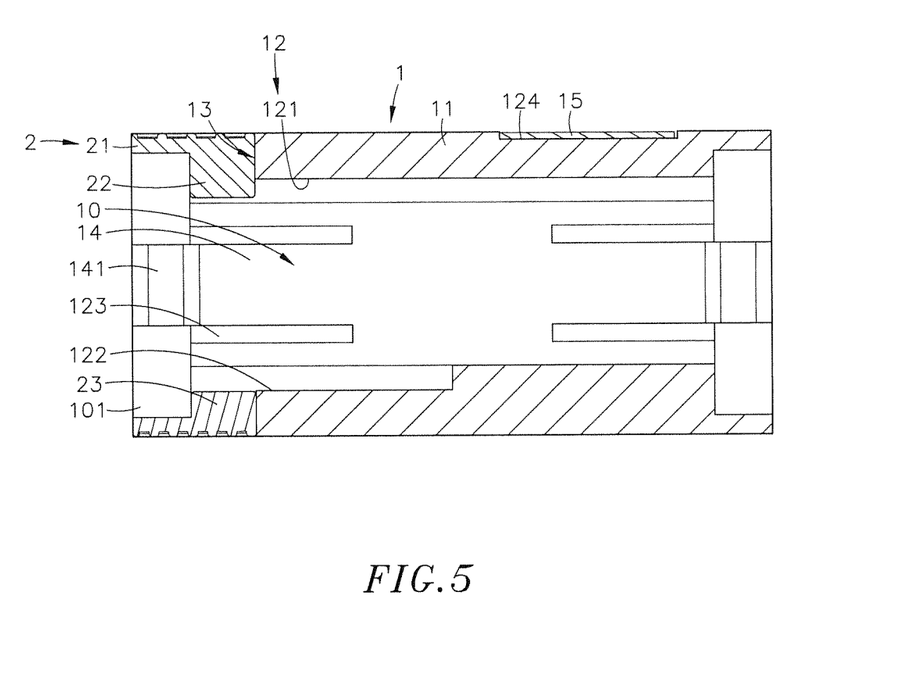
FIG. 5 is a sectional view taken along line A-A of FIG. 4.
Figure 6:
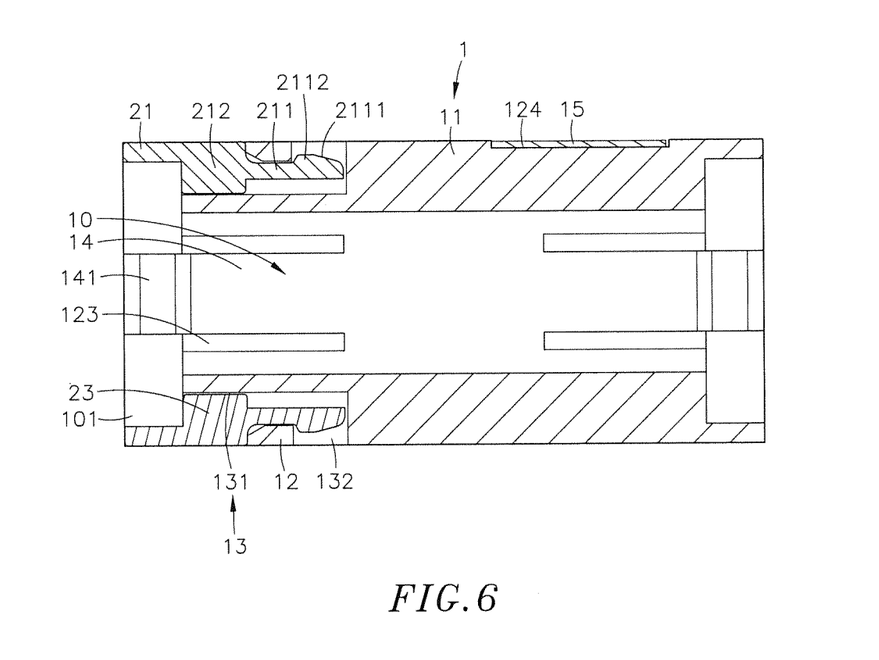
FIG. 6 is a sectional view taken along line B-B of FIG. 4.
Figure 7:
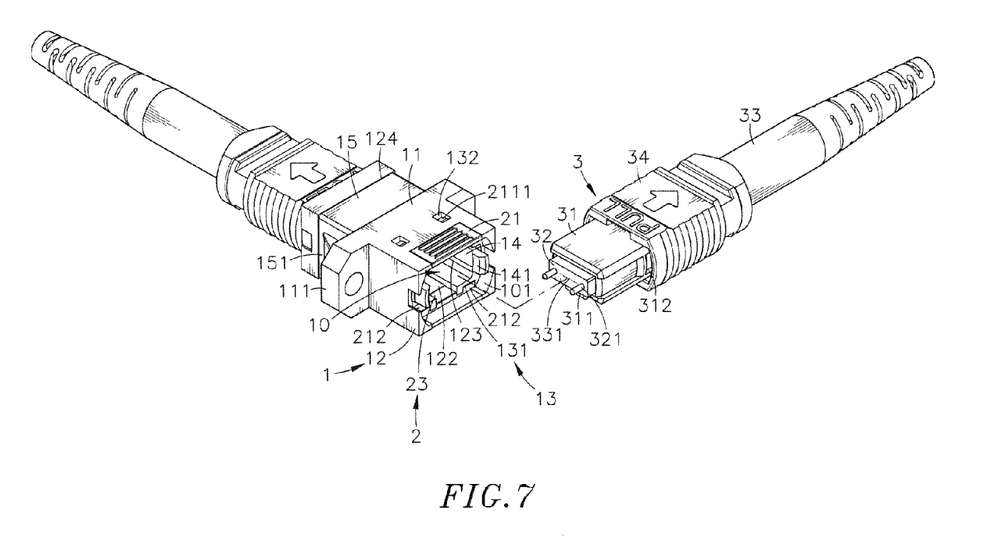
FIG. 7 is an elevational applied view of the present invention, illustrating a female optical fiber connector connected to the reconfigurable fiber optic adapter prior to installation of a mating male optical fiber connector.
Figure 8:
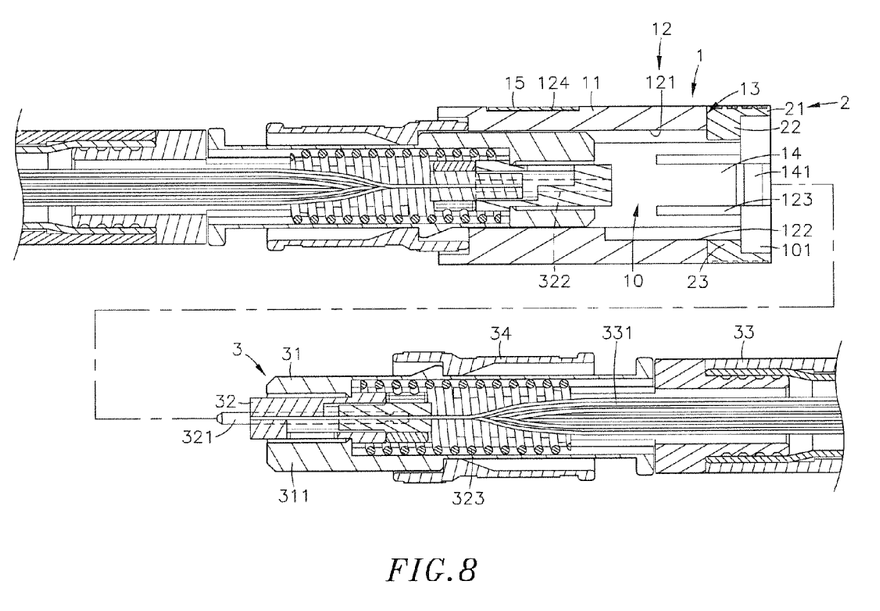
FIG. 8 is a sectional applied view of the present invention, illustrating a female optical fiber connector connected to the reconfigurable fiber optic adapter prior to installation of a mating male optical fiber connector.
Figure 9:
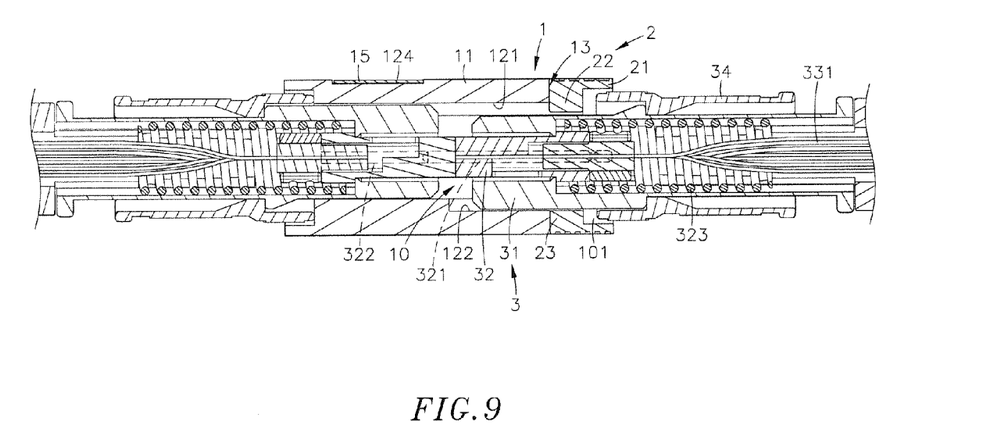
FIG. 9 corresponds to FIG. 8, illustrating the mating male optical fiber connector inserted into the reconfigurable fiber optic adapter and connected to the female optical fiber connector.
Figure 10:
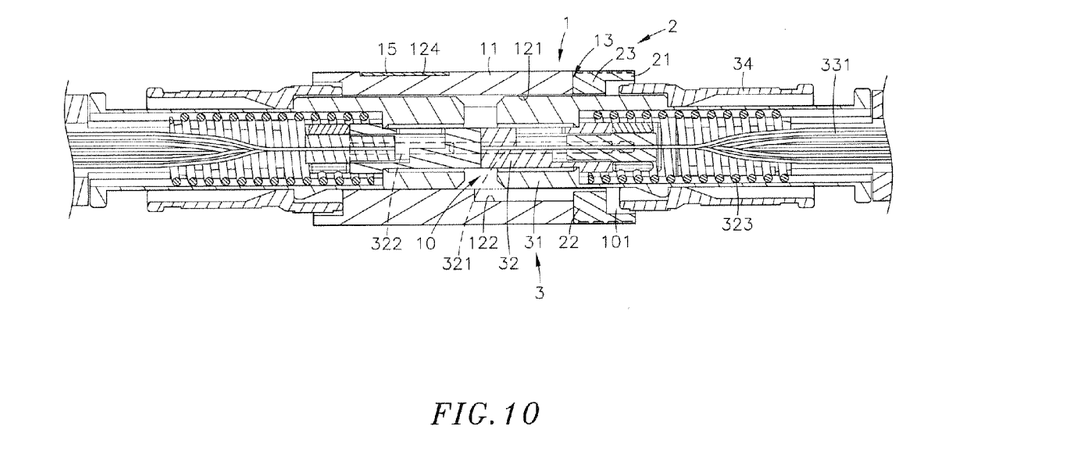
FIG. 10 is similar to FIG. 9, illustrating the two mating-connection control members exchanged.

Preferably, the two mating-connection control members 2 are installed in the housing 1 in such a manner that the Off key 22 of the mating-connection control member 2 projects into the sliding path of the first keyway 121 in the mating connection portion 12 of the housing 1, and the On key 23 is kept in flush with the bottom wall of the second keyway 122 in the respective mating connection portion 12 of the housing 1. When wishing to remove the two mating-connection control members 2 from the housing 1 for position exchange, pull the base panel 21 of the mating-connection control member 2 by two fingers, hook rods 211 away from the respective hook holes 132, and then continue to pull the base panel 21 of the mating-connection control member 2 out of the respective recess 13 of housing 1. At this time, the user can exchange the two mating-connection control members 2, and then install these two mating-connection control members 2 in the respective recesses 13 of the housing 1, enabling the Off key 22 to project into the sliding path in the second keyway 122 and the On key 23 to be kept in flush with the bottom wall of the first keyway 121. Further, the two mating-connection control members 2 are colored in different colors for easy identification of the Off key 22 or On key 23. Thus, the invention facilitates exchange of the positions of the two mating-connection control members 2, enabling the male and female optical fiber connectors 3 to be conveniently installed and accurately connected between the end-user side and the telecommunication-operator side, saving much installation time and labor and assuring a high level of structural stability.

In conclusion, the invention provides a reconfigurable fiber optic adapter for connecting male and female optical fiber connectors together, which comprises a housing 1 that comprises a base portion 11, two mating connection portions 12 located at opposing front and rear sides of the base portion 11, a passage 10 extending through the two mating connection portions 12 and the base portion 11, two plug mouths 101 respectively formed in the mating connection portions 12 in communication between the passage 10 and the atmosphere, a first keyway 121 located in an inner top wall inside the passage 10 and extending from one plug mouth 101 to the other, a second keyway 122 located in an opposing inner bottom wall inside the passage 10 and extending from one plug mouth 101 to a middle part in the base portion 11, two recesses 13 located in opposing top and bottom sides of one mating connection portion 12, two mounting groove units 131 bilaterally located in each recess 13 and two pairs of hook holes 132 located in the opposing top and bottom sides of the mating connection portion 12 carrying the recesses 13, and two mating-connection control members 2 selectively and exchangeably mounted in the mounting groove units 131 in the recesses 13 for controlling the insertion direction of a mating optical fiber connector 3, wherein each mating-connection control member 2 comprises a base panel 21 inserted into one recess 13 of the housing 1, two hook rods 211 extended from the base panel 21 and hooked in respective hook holes 132 in the housing 1, and an Off key 22 or On key 23 located on a middle part of a bottom side of the base panel 21. The Off key 22 of one mating-connection control member 2 and the On key 23 of the other mating-connection control member 2 have different heights so that the Off key 22 projects into the sliding path of one of the first keyway 121 and second keyway 122, and the On key 23 is kept in flush with the bottom wall of the other of the first keyway 121 and second keyway 122.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A reconfigurable fiber optic adapter adapted for connecting a male optical fiber connector and a female optical fiber connector together, comprising:

a housing comprising a base portion, a first mating connection portion located at a front side of said base portion, a second mating connection portion located at an opposing rear side of said base portion, a passage extending through said first mating connection portion, said base portion and said second mating connection portion, two plug mouths respectively located in said first mating connection portion in communication between two opposite ends of said passage and the atmosphere, a first keyway and a second keyway longitudinally located in said passage at opposing top and bottom sides, two recesses respectively symmetrically located in opposing top and bottom sides of said first mating connection portion, two mounting groove units bilaterally located in each said recess, and two pairs of hook holes symmetrically and vertically located in the opposing top and bottom sides of said first mating connection portion in communication with said passage; and a first mating-connection control member and a second mating-connection control member respectively and exchangeably mounted in said two recesses of said housing, said first mating-connection control member and said second mating-connection control member each comprising a base panel mounted in the mounting groove units in the recess at one of the opposing top and bottom sides of said first mating connection portion of said housing and two hook rods bilaterally extended from said base panel and respectively hooked in the respective pair of hook holes in one of the opposing top and bottom sides of said first mating connection portion of said housing, said first mating-connection control member further comprising an Off key located on a bottom side of the base panel thereof and partially projecting into one of said first keyway and said second keyway, said second mating-connection control member further comprising an On key located on a bottom side of the base panel thereof and kept in flush with a bottom wall of one of said first keyway and said second keyway wherein said On key has a height smaller than said Off key, and is kept away from interfering with the sliding movement of a directional key of an external optic fiber connector in said first keyway or said second keyway.

2. The reconfigurable fiber optic adapter as claimed in claim 1, wherein said housing further comprises two side flanges respectively symmetrically located at opposing left and right sides of said base portion, a locating groove extending around the periphery of said second mating connection portion, and a positioning member mounted in said locating groove, said positioning member comprising two opposing side panels, and two clasp shrapnels respectively obliquely extended from said side panels in direction toward said side flanges of said housing.

3. The reconfigurable fiber optic adapter as claimed in claim 1, wherein said first keyway extends along said passage from the plug mouth in said first mating connection portion to the plug mouth in said second mating connection portion; said second keyway extends along said passage from the plug mouth in said first mating connection portion to a mid part of said base portion of said housing.

4. The reconfigurable fiber optic adapter as claimed in claim 1, wherein said housing further comprises two pairs of slots respectively located in opposing left and right sides of said first mating connection portion and said second mating connection portion, and two pairs of springy hooks respectively disposed adjacent to said slots, each said springy hook having a respective outer end terminated in an inwardly protruded hooked portion.

5. The reconfigurable fiber optic adapter as claimed in claim 1, wherein each said mounting groove unit of said housing comprises a sliding groove and an abutment block; said first mating-connection control member and said second mating-connection control member each further comprises two guide blocks respectively slidably coupled to the sliding grooves of the two mounting groove units in one said recess of said housing, a stop block formed integral with one respective said guide block and stopped at a rear wall of the respective said recess, and a position-limit sliding groove defined between each said guide block and said Off key or said On key and coupled to the abutment block of one respective said mounting groove unit.

6. The reconfigurable fiber optic adapter as claimed in claim 5, wherein said Off key has a height larger than the height of each said guide block; said On key has a height smaller than the height of each said guide block.

7. The reconfigurable fiber optic adapter as claimed in claim 1, wherein each said hook rod of each of said first and second mating-connection control members comprises a beveled guide face adapted for guiding movement of the respective said hook rod over into said first keyway or said second keyway, sand a stepped surface portion defined at a rear side of said beveled guide face for hooking in one respective said hook hole.

* * * * *